(12) United States Patent
Hahn et al.

(10) Patent No.: US 11,964,826 B2
(45) Date of Patent: Apr. 23, 2024

(54) CONTAINER TREATMENT SYSTEM AND METHOD FOR CONTAINERS

(71) Applicant: KRONES AG, Neutraubling (DE)

(72) Inventors: Wolfgang Hahn, Neutraubling (DE); Stefan Schober, Neutraubling (DE)

(73) Assignee: KRONES AG, Neutraubling (DE)

( * ) Notice: Subject to any disclaimer, the term of this patent is extended or adjusted under 35 U.S.C. 154(b) by 435 days.

(21) Appl. No.: 17/415,700

(22) PCT Filed: Nov. 22, 2019

(86) PCT No.: PCT/EP2019/082306
§ 371 (c)(1),
(2) Date: Jun. 17, 2021

(87) PCT Pub. No.: WO2020/126315
PCT Pub. Date: Jun. 25, 2020

(65) Prior Publication Data
US 2022/0063926 A1 Mar. 3, 2022

(30) Foreign Application Priority Data
Dec. 18, 2018 (DE) ............ 10 2018 222 194.4

(51) Int. Cl.
*B65G 43/00* (2006.01)
*B65G 43/08* (2006.01)
(Continued)

(52) U.S. Cl.
CPC ......... *B65G 43/08* (2013.01); *B65G 47/5104* (2013.01); *B65G 47/71* (2013.01);
(Continued)

(58) Field of Classification Search
CPC ... B65G 43/00; B65G 47/5104; B65G 47/715
See application file for complete search history.

(56) References Cited

U.S. PATENT DOCUMENTS

| 5,538,054 A | 7/1996 | Lühmann et al. |
| 2014/0332344 A1 | 11/2014 | Jodoin et al. |
| 2017/0334663 A1* | 11/2017 | Ragan ............... B65G 21/2018 |

FOREIGN PATENT DOCUMENTS

| DE | 102017203729 B3 | 2/2018 |
| EP | 3501676 A1 | 6/2019 |
| FR | 2993870 A1 | 1/2014 |

OTHER PUBLICATIONS

Translation of FR 2,993,870; Petrovic Zmaj; Jan. 31, 2014.*
(Continued)

*Primary Examiner* — Paul J Gray
(74) *Attorney, Agent, or Firm* — McCoy Russell LLP

(57) ABSTRACT

Container treatment system for containers, with a transport device for transporting the containers, at least one treatment assembly for treating the containers at a first transport section of the transport device, at least one robot unit for channeling individual treated containers out and/or in at a second transport section of the transport device downstream of the first transport section, and with at least one inspection device for inspecting the individual treated containers, where the second transport section is configured to transport a container flow that is widened as compared to the first transport section so that the individual treated containers can be transported there at reduced speed and/or with reduced dynamic pressure when channeled out and/or in.

14 Claims, 4 Drawing Sheets

(51) Int. Cl.
*B65G 47/51* (2006.01)
*B65G 47/71* (2006.01)
(52) U.S. Cl.
CPC ............ *B65G 2201/0235* (2013.01); *B65G 2203/0258* (2013.01); *B65G 2203/041* (2013.01); *B65G 2203/042* (2013.01)

(56) References Cited

OTHER PUBLICATIONS

ISA European Patent Office, International Search Report Issued in Application No. PCT/EP2019/082306, Mar. 19, 2020, WIPO, 4 pages.

* cited by examiner

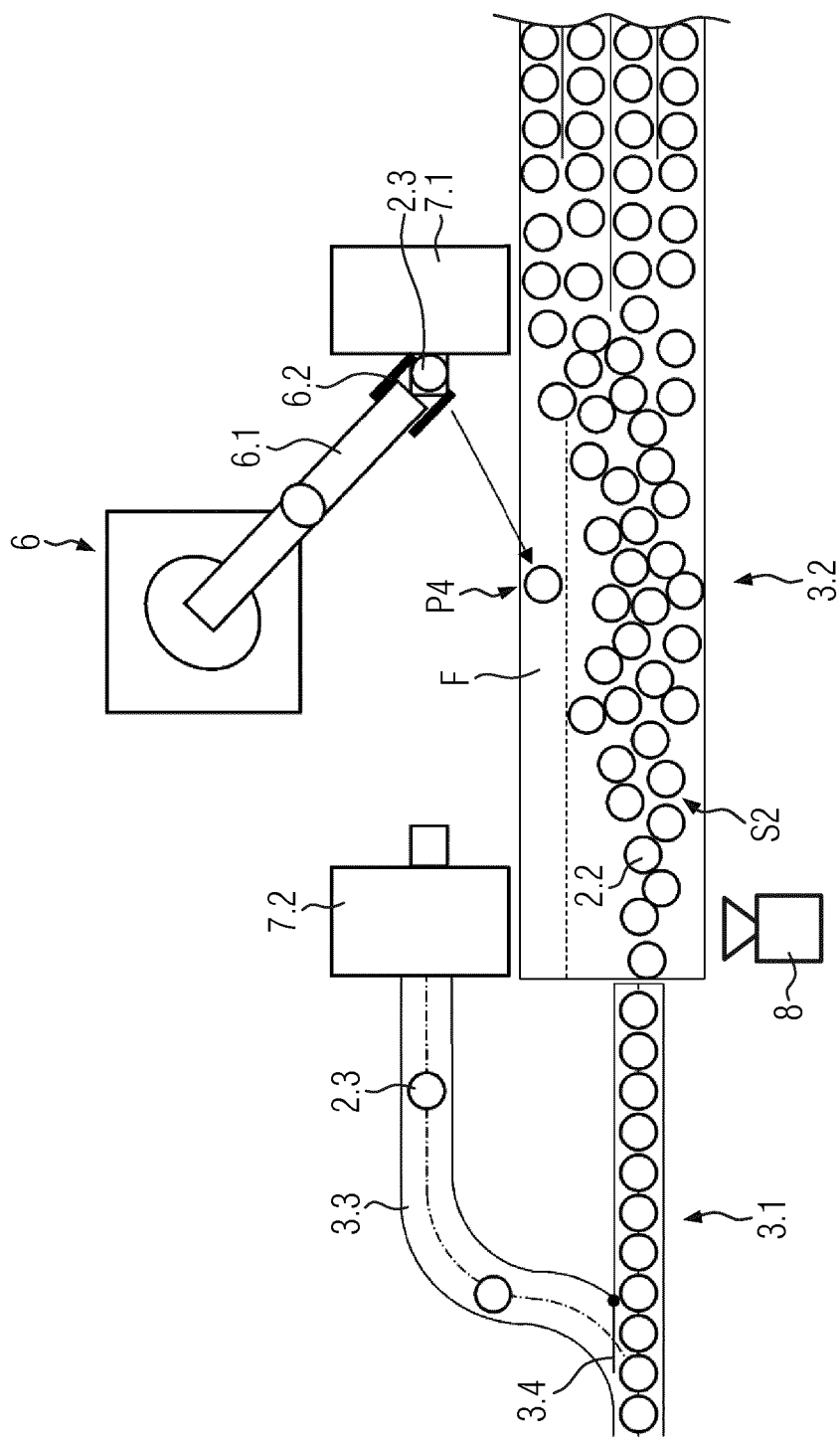

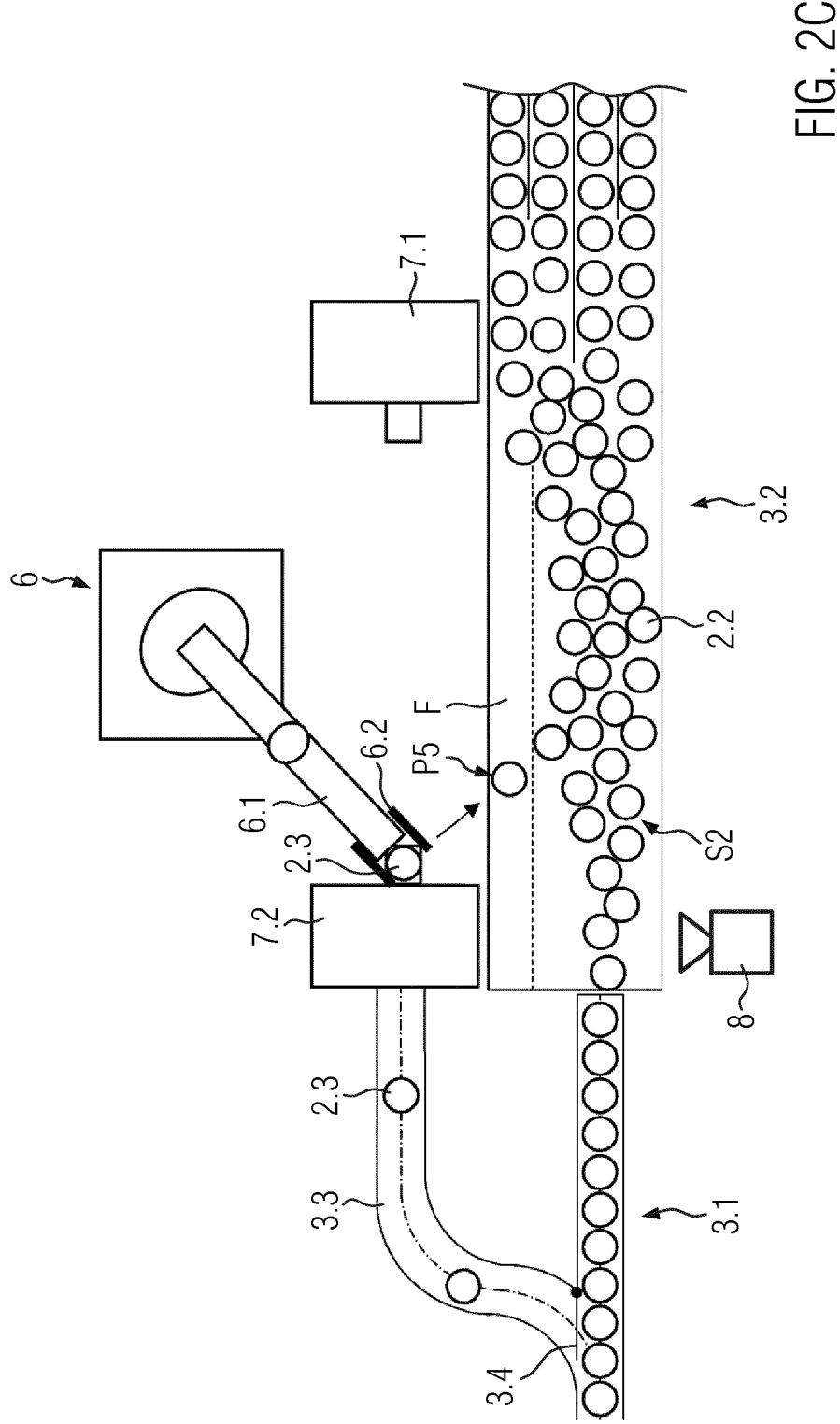

CONTAINER TREATMENT SYSTEM AND METHOD FOR CONTAINERS

CROSS REFERENCE TO RELATED APPLICATIONS

The present application is a U.S. National Phase of International Application No. PCT/EP2019/082306 entitled "CONTAINER TREATMENT SYSTEM AND METHOD FOR CONTAINERS," and filed on Nov. 22, 2019. International Application No. PCT/EP2019/082306 claims priority to German Patent Application No. 10 2018 222 194.4 filed on Dec. 18, 2018. The entire contents of each of the above-listed applications are hereby incorporated by reference for all purposes.

TECHNICAL FIELD

The invention relates to a container treatment system and a container treatment method for containers having the features of the preamble of claims 1 and 8, respectively.

BACKGROUND AND SUMMARY

Such container treatment systems typically comprise a transport device and at least one treatment assembly arranged thereon for treating the containers. For example, it can be a beverage processing system with several conveyors and a filler arranged thereon for filling a liquid product, a closer for closing the containers, and/or a packaging machine for packaging several of the containers to forma a bundle.

In order to verify the quality of the treated containers, inspection stations for online inspection are known which inspect all treated containers online, for example, for the filling level.

In addition, inspection devices for offline inspection are known with which individual treated containers are only inspected at random, since they then have to be, for example, destroyed or time-consuming measurement has to be carried out. This is the case, for example, with $CO_2$ measurement, since the internal pressure in the container must then first be built up prior to measuring.

For this purpose, the individual treated containers are typically channeled out from the container flow of the transport device in an automated manner or manually at a second transport section, for example, via a bypass, and fed to at least one inspection device for inspection of the individual treated containers. The inspected containers are subsequently channeled back into the main container flow via the bypass. This requires a corresponding effort and space for the automated offline inspection.

DE 10 2017 203 729 B3 discloses a storage and distribution unit, a filling system, as well as a method for storing and distributing filled containers. According thereto, a storage for individual containers is present with a container infeed for connection to an outfeed line of a filling line and with a container outfeed for connection to inspection units. In addition, the storage and distribution unit comprises a robot for taking filled containers into storage by transferring containers from the container infeed into the storage and for taking the containers out of storage by transferring them from the storage to the container outfeed.

However, the individual treated containers must first be diverted from the main container flow to the outfeed line.

In addition, a robot with a special gripper for two containers is known from the company FT-System, with which a single treated container is removed from the main container flow for offline inspection and is there immediately replaced by a container that has already been inspected. However, the known robot system is limited in its performance and function and thereby in its flexibility due to the speed of motion of the robot arm and the closed inspection cycle.

The object of the present invention is therefore to provide a container treatment system and a method that allow for more flexible container inspection, require less space, and are less complex.

To satisfy this object, the invention provides a container treatment system having the features of claim 1. Advantageous embodiments of the invention are mentioned in the dependent claims.

For the reason that the second transport section is configured to transport a container flow that is formed to be widened as compared to the first transport section, the treated containers can be transported at the same throughput in the widened container flow at a lower speed than in the first transport section. The containers are preferably positioned with little back pressure or spaced from one another. As a result, the at least one robot unit can channel the individual treated containers out or in at a lower transport speed and/or with reduced dynamic pressure without any other treated containers of the second transport section being affected thereby. In addition, the maximum speed of motion of the at least one robot unit can be reduced due to the lower transport speed. Consequently, it is even at high performance possible with the container treatment system according to the invention to use a robot unit that can be controlled flexibly per se and that requires little space for inward and outward channeling. In addition, the at least one robot unit entails less complexity than a bypass.

The container treatment system can be configured to fill the container with a flowable product, in particular a beverage, and to subsequently close and/or pack the filled containers. The at least one treatment assembly can comprise a container manufacturing machine (for example a stretch-blow-molding machine), a rinser, a labeler, a direct printing machine, a filler, a closer, and/or a packaging machine for the containers.

The containers can be provided to receive beverages, foods, hygiene products, pastes, chemical, biological, and/or pharmaceutical products. In particular, the containers can be provided to receive a flowable product, for example, a beverage. The containers can be, in particular, plastic bottles, glass bottles, cans, and/or tubes. Plastic containers can be, in particular, PET, PEN, HD-PE, or PP containers or bottles, respectively. They can also be biodegradable containers or bottles, the main components of which are made of renewable raw materials such as sugar cane, wheat, or corn. During the inspection with the at least one inspection device, the containers can be empty, filled in part, or completely filled.

The transport device can comprise a linear conveyor and/or a carousel. For example, the first transport section can comprise a carousel of a filler and/or a closer and/or a linear conveyor arranged downstream of the filler and/or closer. The second transport section can comprise a linear conveyor, in particular to transport the treated containers thereon at least in part standing next to one another. The first transport section and/or the second transport section can each be formed by one or more conveyors, such as, for example, by a linear conveyor and/or a carousel. It is conceivable that the transport device comprises guide elements to guide the containers at least during the transition from the first transport section to the second transport section. The second transport section can preferably be configured to transport the containers during operation at the speed that is reduced and/or the dynamic pressure that is reduced in comparison with the first transport section. It is conceivable that a linear conveyor is arranged at a transition from the first transport section to the second transport section, where the linear conveyor of the second transport section is formed to be wider than the linear conveyor of the first transport section. A linear conveyor can be, for example, a conveyor belt, in particular a flexible belt or a transport chain. It is also conceivable that a linear conveyor at least in part forms the first and second transport sections and that it widens. The fact that the second transport section is arranged downstream of the first transport section can presently mean that it follows the first transport section. This can likewise mean that the second transport section is arranged along a container flow downstream of the first transport section. If a second transport section is mentioned hereafter this can always also mean a transport section following the second section.

The at least one robot unit can comprise a robotic arm which is configured in particular as a delta robot, a Scara robot or as an articulated arm robot. It is conceivable that the at least one robot unit is configured to be camera-controlled and/or comprises at least one camera for recording at least the individual treated containers. The camera can be configured as a 3D camera, for example, as a stereo camera or as a time-of-flight camera.

"To channel out" can presently mean that the individual treated containers are removed at random from a main product flow using the at least one robot unit. "To channel in" can mean that at least some of the individual treated containers are returned to the main product flow after inspection by the at least one inspection device, in particular those containers that are not impaired by the inspection.

The at least one inspection device can be provided to inspect the container content, the empty and/or full container, a container closure, a label, and/or a print on the container. For example, the at least one inspection device can be provided to inspect a product filled into the treated containers, in particular with regard to its composition. It is also conceivable that the at least one inspection device is provided to detect properties such as an internal pressure and/or a closure twist-open value, and/or a weight or net weight of a treated container. The at least one inspection device can comprise a sensor, a camera, a scale, and the like. In particular, the at least one inspection device is configured for offline inspection. Offline inspection can presently mean that the treated containers are inspected therewith only at random.

It is conceivable that the container treatment system comprises further inspection stations for online inspection, preferably in the first transport section for inspecting all treated containers.

The first transport section can be configured to transport a single-row container flow and the second transport section can be configured to transport the widened, in particular the multi-row container flow. During treatment, the containers are typically transported as a single-row container flow with at least one treatment assembly, for example, in the filler or in the closer. As a result, the same throughput can then be obtained with the multi-row container flow at the reduced speed.

The at least one robot unit can comprise a robotic arm with a gripper for at least one of the individual treated containers. As a result, the individual treated containers can be individually channeled out from the widened container flow and/or channeled back thereinto again. It is also conceivable that several containers can be channeled in and/or out at the same time with the gripper. The gripper can be arranged at a movable end of the robotic arm. The gripper can be configured to pick up one of the containers at the neck finish portion.

The second transport section can at least in part be wider transverse to its transport direction than the widened container flow, so that a free space arises at least temporarily during operation next to the widened container flow for channeling the individual treated containers in and/or out. As a result, the individual treated containers can be removed and/or supplied without contacting the other containers using the at least one robot unit in the region of the free space of the transport section.

The at least one robot unit can be arranged at the second transport section and the at least one inspection device in such a way that the individual treated containers can be channeled out therewith from the second transport section toward the at least one inspection device and/or can be channeled in from the at least one inspection device to the second transport section. In other words, the at least one robot unit can be arranged directly at the second transport section.

In addition, the at least one robot unit can be arranged in such a way that it delivers and/or picks up the individual treated containers directly at the at least one inspection device. It is also conceivable that an intermediate storage for the individual treated containers is arranged between the at least one robot unit and the at least one inspection device. It is also conceivable that containers that are channeled out are made available for more precise and/or later measurement, e.g. in a laboratory.

The transport device can comprise a third transport section which is configured as a bypass between the track switch for channeling out at least a portion of the individual treated containers and the at least one inspection device, where the at least one robot unit is arranged between the at least one inspection device and the second transport section in such a way that the portion of the individual treated containers channeled out with the bypass can be channeled in again into the widened container flow downstream of the at least one inspection device. As a result, the at least one robot unit can be combined with the bypass and can therefore be used in a particularly flexible manner. For example, the bypass can be arranged such that it channels out the portion of individual treated containers from the first transport section via the track switch toward a first inspection device. The at least one robot unit can be arranged such it channels in the inspected containers from the first inspection device at least in part into the widened container flow at the second transport section. It is also conceivable that the same robot unit is configured to channel out a different portion of individual treated containers from the widened container flow from the second transport section toward a second inspection device and, after inspection, to channel it back again into the widened container flow at the second transport section. This allows the container treatment system to operate even more flexibly.

At least one camera can be arranged at the transport device to track transport paths of individual treated containers in their camera images before they are channeled out in such a way that the individual treated containers can be associated with one of several treatment organs of the at least one treatment assembly, for example, with one of several filling valves. As a result, an inspection result of a container can be associated with a specific treatment organ despite the widened container flow, and maintenance can thus be supported. In the case of a single-row container flow, the containers of the first transport section can typically be associated with the respective treatment organ solely on the basis of their sequential order. This is also possible for the widened container flow with the at least one camera in that the transport paths of the individual treated containers are tracked. It is conceivable that the at least one camera comprises or is connected to an image processing device for determining the transport paths in a plurality of camera images and to thereby track them.

It is also possible for an association with a treatment device to be made by coding the containers and/or labeling the containers and recognizing the coding.

For satisfying the object, the invention additionally provides a container treatment method for containers having the features of claim 8. Advantageous embodiments of the invention are mentioned in the dependent claims.

For the reason that the treated containers are transported in the second transport section as a container flow that is widened as compared to the first transport section, the treated containers can be transported at the same throughput in the widened container flow at a lower speed than in the first transport section. As a result, the at least one robot unit can channel the individual treated containers out or in at a lower transport speed and/or with reduced dynamic pressure without any other treated containers of the second transport section being affected thereby. In addition, the maximum speed of motion of the at least one robot unit can be reduced due to the lower transport speed. Consequently, it is even at high performance possible with the container treatment system according to the invention to use a robot unit that can be controlled flexibly and that requires little space for inward and outward channeling. In addition, the at least one robot unit entails less complexity than a bypass.

The container treatment method can comprise mutatis mutandis the features individually or in any combination described above in relation to the container treatment system, in particular according to one of the claims 1 to 7. The container treatment method, in particular according to one of the claims 8-14, can be carried out with the container treatment system, in particular according to one of the claims 1-7.

The individual treated containers can be channeled out from the widened container flow in a first step by the at least one robot unit, subsequently inspected with the inspection device in a second step, and then in a third step be channeled into the widened container flow at least in part by the at least one robot unit.

The containers can be transported in a single row in the first transport section and in multiple rows or in aisles in the second transport section. The containers are typically transported in a single row during treatment with at least one treatment assembly, for example, when filling or closing them. As a result, the same throughput can then be obtained with the multi-row container flow at the reduced speed.

The individual treated containers can first be moved by the at least one robot unit transverse to the widened container flow into a free space of the second transport section and then channeled out. As a result, the individual treated containers can first be released from contact with the other containers and then channeled out in the free space. As a result, the widened container flow is adversely affected only to a small extent during outward channeling, so that congestion is avoided. It is conceivable that the individual treated containers are initially moved transversely and/or longitudinally relative to a transport direction of the second transport section into the free space when being channeled out by the at least one robot unit and then lifted off.

The individual treated containers can first be channeled in by the at least one robot unit into a free space of the second transport section transverse to the widened container flow and then merged with the widened container flow. As a result, the individual treated containers are first channeled in without contact to the widened container flow and only then merged with the widened container flow. As a result, the widened container flow is adversely affected only to a small extent during inward channeling, so that congestion is avoided. It is conceivable that the individual treated containers are first placed by the at least one robot unit into the free space and then merged with the widened container flow using a guide element.

At least a portion of the individual treated containers can be channeled out by a track switch and transported via a bypass to the at least one inspection device and inspected there, where the at least one portion of the individual treated containers can again be channeled in by the at least one robot unit at the second transport section after the inspection. As a result, the at least one robot unit can be combined with the bypass and can therefore be used in a particularly flexible manner. It is conceivable that a first portion of the individual treated containers is channeled out by a track switch and transported via a bypass to a first inspection device and inspected there, where a second portion of the individual treated containers is channeled out at the second transport section and fed to a second inspection device and inspected there, and where the first portion and the second portion of the individual treated containers are again channeled in by the at least one robot unit at the second transport section after the inspection. At least a portion of the containers can be provided e.g. for the purpose of further investigation in a laboratory by the at least one robot unit, e.g. in a suitable container.

Transport paths of the individual treated containers can each be tracked with at least one camera prior to being channeled out, where the individual treated containers are associated, based on the transport paths tracked, to one of several treatment organs of the treatment assembly, for example, one of several filling valves. As a result, an inspection outcome of a container can be associated with a specific treatment organ despite the widened container flow, and maintenance can thus be supported. It is conceivable that camera images from the at least one camera are evaluated using an image processing device with regard to the positions of the individual containers at the first and/or second transport section in order to track the transport paths.

BRIEF DESCRIPTION OF THE FIGURES

Further features and advantages of the invention shall be explained in more detail hereafter with reference to the embodiment illustrated in the figures, where

FIG. 2B shows a detailed representation of the container treatment system from FIG. 1 when individual treated containers are channeled in by the robot unit from the first inspection device; and FIG. 2C shows a detailed representation of the container treatment system from FIG. 1 when a portion of individual treated containers is channeled out by a track witch and a bypass to a second inspection device and when the inspected containers are channeled in by the robot unit.

DETAILED DESCRIPTION

Figure 1:
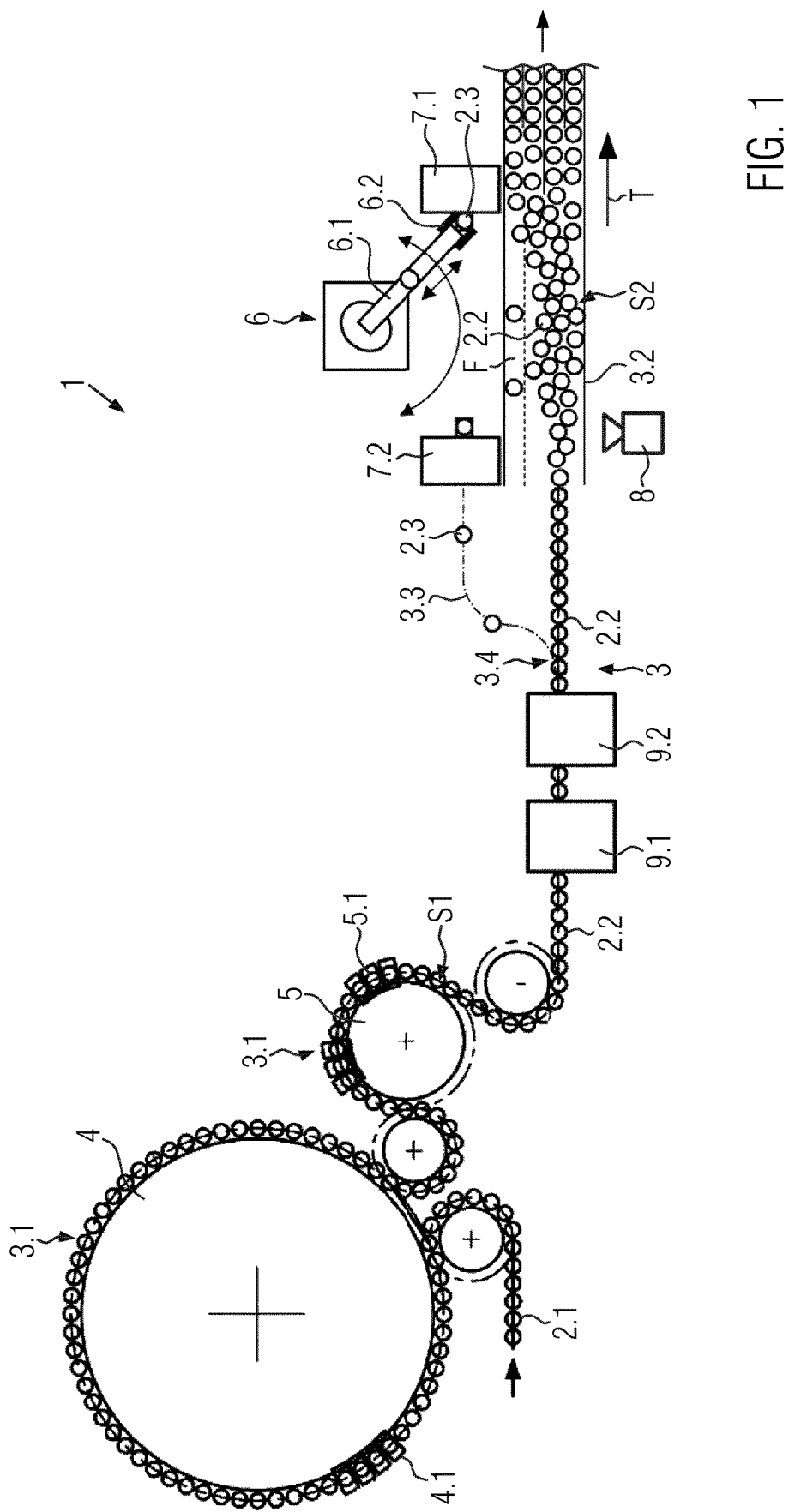
FIG. 1 shows an embodiment according to the invention of a container treatment system for containers in a top view.

An embodiment according to the invention of a container treatment system 1 for containers 2.1-2.3 is shown in FIG. 1 in a top view. It can be seen that container treatment system 1 comprises two treatment assemblies 4 and 5 for treating containers 2.1, which are presently configured merely by way of example as fillers or closers for filling containers 2.1 with a beverage and for closing them. It is also conceivable that container treatment system 1 comprises only one treatment assembly.

First treatment assembly 4 comprises several treatment organs 4.1 on a transport carousel which are presently configured as filling organs for filling several containers 2.1 with the beverage simultaneously during transport. Correspondingly, second treatment assembly 5 comprises several treatment organs 5.1 on a further transport carousel which are presently configured as closure heads for providing filled containers 2.1 with a closure, for example, with a crown cap. Containers 2.2 treated in this manner are subsequently fed to an inspection with online inspection stations 9.1, 9.2, and individual treated containers 2.3 are fed to offline inspection devices 7.1, 7.2.

It can therefore be seen that two inspection stations 9.1, 9.2 for online inspection and two inspection devices 7.1, 7.2 for offline inspection are arranged downstream of two treatment assemblies 4, 5. For example, the filling level and the closure seat of all treated containers 2.2 are inspected with online inspection stations 9.1, 9.2. In contrast, individual treated containers 2.3 are inspected with inspection devices 7.1, 7.2 only at random.

Furthermore, container treatment system 1 comprises transport device 3 with first transport section 3.1 and second transport section 3.2, where two treatment assemblies 4, 5 as well as inspection stations 9.1, 9.2 are arranged at first transport section 3.1, and inspection devices 7.1, 7.2 at second transport section 3.2.

First transport section 3.1 of transport device 3 is presently formed only by way of example by several conveyors, in particular by transport carousels of two treatment assemblies 4, 5, several transport stars, and by a linear conveyor at which inspection stations 9.1, 9.2 are arranged for online inspection. Containers 2.1 are transported with first transport section 3.1 during treatment as well as treated containers 2.2 during inspection as a single-row container flow S1.

It can furthermore be seen that second transport section 3.1 adjoins first transport section 3.2 and is formed by a further linear conveyor, for example, a conveyor belt. Arrange thereon is robot unit 6 for channeling individual treated containers 2.3 out and/or in. However, it is also conceivable that one or more further robot units 6 are arranged at second transport section 3.1 in FIG. 12C for channeling individual treated containers 2.3 out and/or in, for example, for channeling them out and/or in to further inspection devices.

Second transport section 3.2 is configured to transport an in particular multi-row container flow S2 that is widened as compared to first transport section 3.1, so that individual treated containers 2.3 are transported there at reduced speed and/or with reduced or without dynamic pressure when being channeled out and/or in. Robot unit 6 comprises a robotic arm 6.1 with gripper 6.2 for channeling out one of individual treated containers 2.3 from widened container flow S2 and for feeding it to first inspection device 7.1 or for channeling it in again into widened container flow S2 after inspection by first inspection device 7.1 or second inspection device 7.2.

Camera 8 is furthermore arranged at transport device 3 for associating individual treated containers 2.3 with treatment organs 4.1, 5.1 of two treatment assemblies 4, 5. It captures containers 2.2, 2.3 in the region of the second transport section as camera images which are subsequently evaluated using an image processing device (presently not shown) in order to track the transport paths of individual treated containers 2.3 until they are channeled out by robot unit 6. Accordingly, an inspection result can then be associated with one of treatment organs 4.1, 5.1.

A portion of individually treated containers 2.3 is channeled out to second inspection device 7.2 not by robot unit 6, but rather via track switch 3.4 and a third transport section 3.3 configured as a bypass. Track switch 3.4 is arranged at first transport section 3.1 for randomly channeling out the portion of individual treated containers 2.3 toward the second inspection device. Containers 2.3 inspected thereby are channeled into widened container flow S2 at second transport section 3.2 by way of robot unit 6.

In other words, robot unit 6 is arranged at second transport section 3.1 and first inspection device 7.1 such that individual treated containers 2.3 can therewith be channeled out from second transport section 3.2 toward at least one inspection device 7.1, 7.2 and/or can be channeled in from first and second inspection device 7.1, 7.2 towards second transport section (3.2).

However, it is also conceivable that only one of two inspection devices 7.1, 7.2 is present or that third transport section 3.3 is omitted and individual treated containers 2.3 are channeled out by robot unit 6 from second transport section 3.2 to both inspection devices 7.1, 7.2.

Container treatment system 1 in FIG. 1 is employed as follows: Containers 2.1-2.3 are transported with transport device 3, where containers 2.1-2.3 are treated by treatment assemblies 4, 5 or only one treatment assembly at first transport section 3.1 of transport device 3, where robot unit 6 then channels individual treated containers 2.3 out and/or in at second transport section 3.2 of transport device 3, and where individual treated containers 2.3 are inspected with inspection devices 7.1, 7.2 or also only one inspection device.

Treated containers 2.2 are transported at second transport section 3.2 as a container flow S2 that is widened as compared to first transport section 3.1, so that individual treated containers 2.3 are transported there at reduced speed and/or with reduced or without dynamic pressure when being channeled out and/or in.

For the reason that second transport section 3.2 is configured to transport a container flow that is formed to be widened as compared to first transport section 3.1, treated containers 2.3 can be transported at the same throughput in widened container flow S2 at a lower speed than in first transport section 3.1. The widened container flow makes it possible to transport the same maximum throughput over second transport section 3.2 as over first transport section 3.1, even at the reduced speed. Treated containers 2.2 can be transported somewhat drawn apart laterally in second transport section 3.2 in order to reduce or avoid dynamic pressure. As a result, robot unit 6 can channel individual treated containers 2.3 out or in at a lower transport speed and/or with reduced dynamic pressure without any other treated containers 2.2 of second transport section 3.2 being affected thereby. In addition, the maximum speed of motion of robot unit 6 can be reduced due to the lower transport speed. Consequently, it is even at high performance possible with container treatment system 1 according to the invention to use a robot unit 6 that can be controlled flexibly and that requires little space for inward and outward channeling. In addition, robot unit 6 entails less complexity than, for example, a bypass.

Figure 2A:
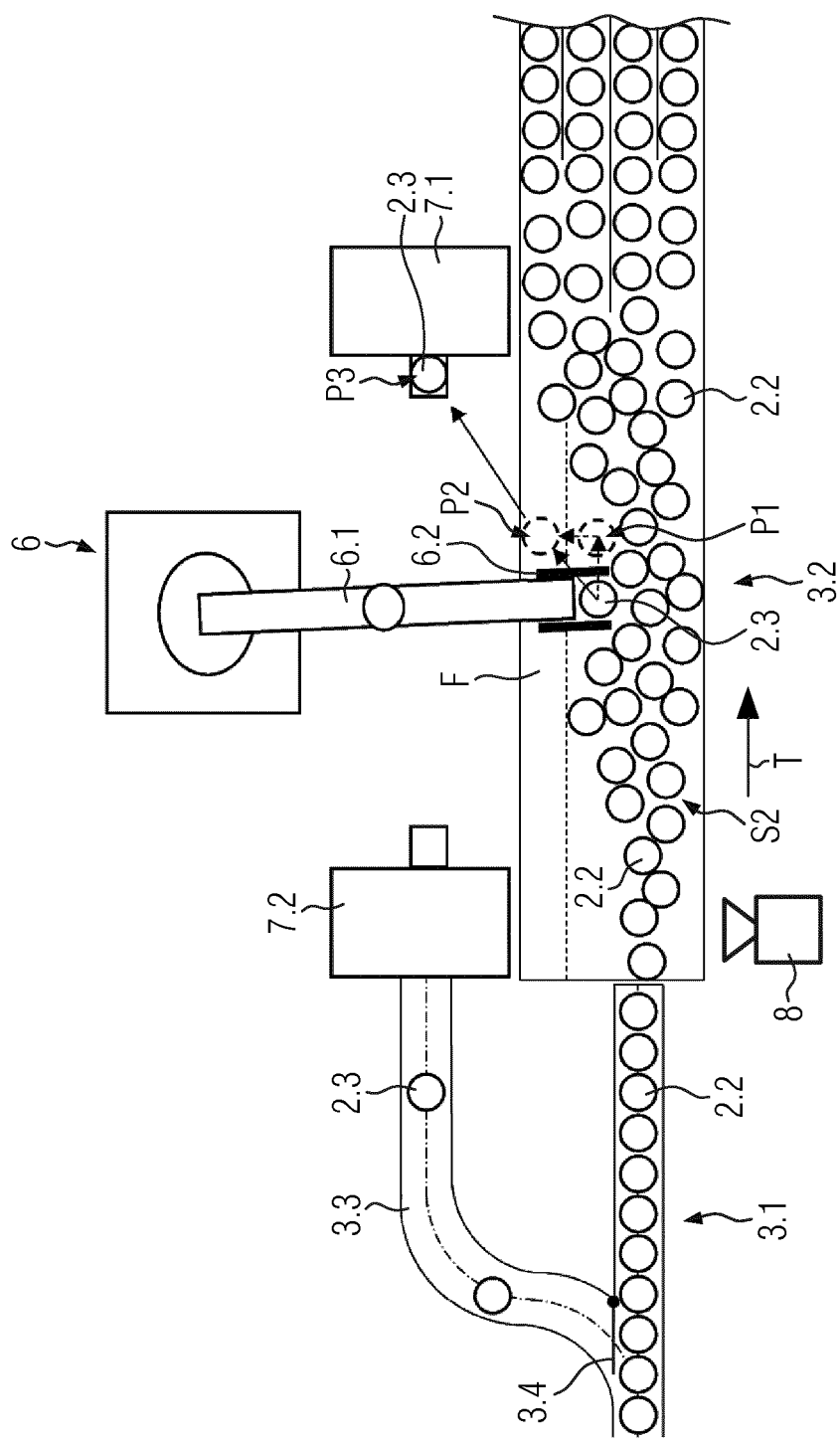
FIG. 2A shows a detailed representation of the container treatment system from FIG. 1 when individual treated containers are channeled out by the robot unit to a first inspection device.

Channeling individual treated containers 2.3 out and in is explained in more detail below with reference to FIGS. 2A-2C:

FIG. 2A shows a detailed representation of container treatment system 1 from FIG. 1 when individual treated containers 2.3 are channeled out by robot unit 6 to a first inspection device 7.1. It can be seen that treated containers 2.2 are transported in a single row in first transport section 3.1, i.e. sequentially one behind the other, and are then transferred to second transport section 3.2. Second transport section 3.2 is presently formed to be wider than first transport section 3.1, for example, with a widened conveyor belt on which treated containers 2.1 are transported standing upright as a widened container flow S2. As an example only, widened container flow S2 is then separated downstream into individual aisles in order to convey it to a subsequent packaging machine in an orderly manner.

It can also be seen that treated containers 2.2 push apart due to reduced speed of second transport section 3.2 as compared to first transport section 3.1 and thereby form widened container flow S2. As a result, there is also at least a reduced or no dynamic pressure on the containers.

It can also be seen that second transport section 3.2 is formed to be wider transverse to its transport direction T than widened container flow S2. This creates free space F next to the widened container flow S2 in which individual treated containers 2.3 are channeled in and out by robot unit 6.

This takes place, as can be seen in FIG. 2A, in that a single treated container 2.3 is picked up by gripper 6.2 of robotic arm 6.1 and first moved via position P1 next to other containers 2.2 transverse to transport direction T to position P2 into free space F. It is conceivable that individual container 2.3 is still supported by the conveyor belt of transport section 3.2 and is only moved thereon by way of robot unit 6. Individual treated container 2.3 is subsequently lifted by robot unit 6 and fed to first inspection device 7.1 at position P3. Due to the fact that container 2.3 is not touched by other treated containers 2.2 of widened container flow S2 in the region of free space F (position P2), the former can be safely removed from there from the side. In principle, however, it is also possible to remove a container 2.3 at any other position and to first move it vertically out of container flow S2 during transport. Container flow S2 can also be aisle-guided, i.e., the containers can be transported in parallel in several aisles separated by guide elements.

Container 2.3 shown at position P3 is subsequently inspected with inspection device 7.1, for example, for a correct $CO_2$ content.

In addition, the transport path of individual treated container 2.3 is tracked with camera 8 still before it is channeled out and associated with one of treatment organs 4.1, 5.1 of treatment assemblies 4, 5. It is conceivable that the association is only made with treatment organs 4.1 (for example, a filling valve) of one of treatment assemblies 4, 5 (presently the filler). However, it is also possible to associate a container 2.3 with treatment organs 4.1, 5.1 of two treatment assemblies 4, 5. It can then be determined, for example, which filling valve and/or which closing head is defective.

FIG. 2B shows a detailed representation of container treatment system 1 from FIG. 1 when individual treated containers 2.3 are channeled in by robot unit 6 from a first inspection device 7.1. It can be seen that individual treated container 2.3 is picked up again with gripper 6.2 of robotic arm 6.1 after the inspection at first inspection device 7.1 and is placed into free space F of second transport section 3.2 at position P4 transverse to widened container flow S2. Due to the fact that other containers 2.2 that have already been treated there do not touch container 2.3 that has been returned, it can be safely channeled in again there.

Inspected container 2.3 is then again merged into widened container flow S2, for example, by way of guide elements (presently not shown).

FIG. 2C shows a detailed representation of container treatment system 1 from FIG. 1 when a portion of individual treated containers 2.3 is channeled out by a track witch 3.4 and a third transport section 3.3 (bypass) to a second inspection device 7.2 and when inspected containers 2.3 are channeled in by robot unit 6.

It can be seen that individual treated containers 2.2 are channeled out from first transport section 3.1 by way of track switch 3.4 and fed directly to second inspection device 7.1 using third transport section 3.3, i.e. the bypass. After inspection, containers 2.3 are picked up with gripper 6.2 of robotic arm 6.1 and placed into free space F of second transport section 3.2 at position P5 transverse to widened container flow S2, therefore similarly to FIG. 2B.

Channeling out through a bypass 3.3 can therefore also be combined with channeling in with the aid of robot unit 6. As a result, container treatment system 1 or the container treatment method, respectively, can be used even more flexibly.

It is understood that the features mentioned above in the embodiments described are not restricted to these feature combinations but are also possible individually or in any other combination.

The invention claimed is:

1. A container treatment system for containers, with
a transport device for transporting said containers,
at least one treatment assembly for treating said containers at a first transport section of said transport device,
at least one robot unit for channeling individual treated containers in and/or out at a second transport section of said transport device which is arranged downstream of said first transport section, and
with at least one inspection device for inspecting said individual treated containers,
wherein,
said second transport section is configured to transport a container flow that is widened as compared to said first transport section, so that said individual treated containers are transported there at reduced speed and/or with reduced dynamic pressure when being channeled out and/or in, and
where said at least one robot unit is arranged between said second transport section and said at least one inspection device such that said individual treated containers can be channeled out therewith from said second transport section toward said at least one inspection device and can be channeled in from said at least one inspection device toward said second transport section.

2. The container treatment system according to claim 1, where said first transport section is configured for transporting a single-row container flow and said second transport section for transporting the widened multi-row container flow.

3. The container treatment system according to claim 1, where said at least one robot unit comprises a robotic arm with a gripper for at least one of said individual treated containers.

4. The container treatment system according to claim 1, where said second transport section is formed to be at least in part wider transverse to its transport direction (T) than said widened container flow, so that a free space (F) arises at least temporarily during operation next to said widened container flow for channeling said individual treated containers in and/or out.

5. The container treatment system according to claim 4, where said transport device comprises a third transport section which is configured as a bypass between a track switch for channeling out at least a portion of said individual treated containers and said at least one inspection device, and where said at least one robot unit is arranged between said at least one inspection device and said second transport section such that the portion of said individual treated containers channeled out by said bypass can be channeled in again into said widened container flow downstream of said at least one inspection device.

6. The container treatment system according to claim 1, where at least one camera is arranged at said transport device to track transport paths of individual treated containers in their camera images before they are respectively channeled out in such a way that said individual treated containers can be associated with one of several treatment organs of said at least one treatment assembly.

7. The container treatment system according to claim 6, where said one of several treatment organs of said at least one treatment assembly is one of several filling valves.

8. A container treatment method for containers, where said containers are transported with a transport device, where said containers are treated by at least one treatment assembly at a first transport section of said transport device, where at least one robot unit subsequently channels individual treated containers out and/or in at a second transport section of said transport device, and where said individual treated containers are inspected with at least one inspection device, wherein, said treated containers are transported in said second transport section as a container flow that is widened as compared to said first transport section, so that said individual treated containers are transported there at reduced speed and/or with reduced dynamic pressure when being channeled out and/or in, and said individual treated containers are channeled out from said widened container flow in a first step by said at least one robot unit, subsequently inspected with said inspection device in a second step, and then in a third step are channeled into said widened container flow at least in part by said at least one robot unit.

9. The container treatment method according to claim 8, where said containers are transported in a single row in said first transport section and in multiple rows or in aisles in said second transport section.

10. The container treatment method according to claim 8, where said individual treated containers are first moved by said at least one robot unit transverse to said widened container flow into a free space (F) of said second transport section and then channeled out.

11. The container treatment method according to claim 8, where said individual treated containers are first channeled by said at least one robot unit into a free space (F) of said second transport section transverse to said widened container flow and then merged with said widened container flow.

12. The container treatment method according to claim 8, where at least a portion of said individual treated containers is channeled out by a track switch and transported via a bypass to said at least one inspection device and inspected there, and where said at least one portion of said individual treated containers is again channeled in by said at least one robot unit at said second transport section after inspection.

13. The container treatment method according to claim 8, where transport paths of said individual treated containers are each tracked with at least one camera prior to being channeled out, and where said individual treated containers are associated, based on the transport paths tracked, with one of several treatment organs of said treatment assembly.

14. The container treatment method according to claim 13, where said one or several treatment organs of said treatment assembly is one of several filling valves.

* * * * *